(12) United States Patent
Greinert et al.

(10) Patent No.: US 9,115,464 B2
(45) Date of Patent: Aug. 25, 2015

(54) PARTICLES FOR ELECTROPHORETIC DISPLAYS

(75) Inventors: Nils Greinert, Stonehouse (GB); Louise Diane Farrand, Dorset (GB); Mark James, Romsey (GB); Ashley Nathan Smith, Southampton (GB); Mark John Goulding, Ringwood (GB); Daniel Walker, Darmstadt (DE); Safyan Khan, Bristol (GB); Paul Reynolds, Winford (GB); Susan Hawkins, Bristol (GB); Roy Hughes, Bristol (GB)

(73) Assignee: Merck Patent GmbH, Darmstadt (DE)

( * ) Notice: Subject to any disclaimer, the term of this patent is extended or adjusted under 35 U.S.C. 154(b) by 984 days.

(21) Appl. No.: 13/148,391

(22) PCT Filed: Jan. 29, 2010

(86) PCT No.: PCT/EP2010/000549
§ 371 (c)(1),
(2), (4) Date: Nov. 7, 2011

(87) PCT Pub. No.: WO2010/089057
PCT Pub. Date: Aug. 12, 2010

(65) Prior Publication Data
US 2012/0041165 A1   Feb. 16, 2012

(30) Foreign Application Priority Data
Feb. 9, 2009   (EP) .................................... 09001771

(51) Int. Cl.
| | | |
|---|---|---|
| *C08F 228/06* | (2006.01) | |
| *C08F 228/02* | (2006.01) | |
| *C09B 49/04* | (2006.01) | |
| *C08F 226/02* | (2006.01) | |
| *C09B 49/06* | (2006.01) | |
| *D06P 1/00* | (2006.01) | |
| *C08F 220/14* | (2006.01) | |
| *C08F 220/30* | (2006.01) | |
| *C08F 220/36* | (2006.01) | |
| *C09B 69/10* | (2006.01) | |
| *G02F 1/167* | (2006.01) | |
| *B82Y 30/00* | (2011.01) | |
| *B82Y 40/00* | (2011.01) | |

(52) U.S. Cl.
CPC .............. *D06P 1/006* (2013.01); *C08F 220/14* (2013.01); *C08F 220/30* (2013.01); *C08F 220/36* (2013.01); *C09B 69/106* (2013.01); *G02F 1/167* (2013.01); *G02F 2001/1678* (2013.01)

(58) Field of Classification Search
CPC .... C08F 220/14; C08F 220/06; C08F 220/36; C08F 220/20; C08F 220/30; C08F 220/38; C08F 228/06; C08F 2/18; C09B 69/106; C09B 31/043; C09B 62/465; C09B 62/467; C09B 62/473; C09B 62/475; C09B 69/10; C09B 69/108

USPC .................. 526/257, 287, 311; 534/611, 730; 977/773, 897, 952
See application file for complete search history.

(56) References Cited

U.S. PATENT DOCUMENTS

| | | | |
|---|---|---|---|
| 4,613,559 A | 9/1986 | Ober et al. | |
| 5,227,444 A | 7/1993 | Muller et al. | |
| 5,380,362 A | 1/1995 | Schubert | |
| 5,403,518 A | 4/1995 | Schubert | |
| 5,607,864 A | 3/1997 | Ricchiero et al. | |
| 5,663,024 A * | 9/1997 | Smith et al. ..................... | 430/97 |
| 5,716,855 A | 2/1998 | Lerner et al. | |
| 5,783,614 A | 7/1998 | Chen et al. | |
| 6,194,488 B1 | 2/2001 | Chen et al. | |
| 6,822,782 B2 | 11/2004 | Honeyman et al. | |
| 6,956,690 B2 | 10/2005 | Yu et al. | |
| 7,038,655 B2 | 5/2006 | Herb et al. | |
| 7,052,766 B2 | 5/2006 | Zang et al. | |
| 7,110,162 B2 | 9/2006 | Wu et al. | |
| 7,170,670 B2 | 1/2007 | Webber | |
| 7,226,550 B2 | 6/2007 | Hou et al. | |
| 7,236,290 B1 | 6/2007 | Zhang et al. | |
| 7,277,218 B2 | 10/2007 | Hwang et al. | |
| 7,304,634 B2 | 12/2007 | Albert et al. | |
| 2005/0267263 A1 | 12/2005 | Minami | |
| 2007/0128352 A1 | 6/2007 | Honeyman et al. | |
| 2007/0268244 A1 | 11/2007 | Chopra et al. | |
| 2007/0297038 A1 | 12/2007 | Chopra et al. | |

(Continued)

FOREIGN PATENT DOCUMENTS

| | | |
|---|---|---|
| EP | 1 491 941 | 12/2004 |
| GB | 2 438 436 | 11/2007 |

(Continued)

OTHER PUBLICATIONS

Ego, C. et al., "Attaching perylene dyes to polyfluorene: Three simple, efficient methods for facile color tuning of light-emitting polymers," J. Am. Chem. Soc., 2003, vol. 125, pp. 437-443.

Kim, T. H. et al., "Preparation and Characterization of Colored Electronic Ink Nanoparticles by High Temperature-Assisted Dyeing for Electrophoretic Displays," Journal of Nanoscience and Nanotechnology, 2006, vol. 6, pp. 3450-3454.

Tse, A. S. et al., "Synthesis of Dyed Monodisperse Poly(methyl methacrylate) Colloids for the Preparation of Submicron Periodic Light-Absorbing Arrays," Macromolecules, 1995, vol. 28, pp. 6533-6538.

Xie, S. et al., "Recent developments in aromatic azo polymers research," Chem. Mater., 1993, vol. 5, No. 4, pp. 403-411.

(Continued)

*Primary Examiner* — Ling Choi
*Assistant Examiner* — Chun-Cheng Wang
(74) *Attorney, Agent, or Firm* — Millen, White, Zelano & Branigan, P.C.

(57) ABSTRACT

This invention relates to colored polymer particles preferably with surface functionality for charge retention, a process for their preparation, the use of these particles for the preparation of an electrophoretic device, color electrophoretic displays comprising such particle, and new water-soluble dyes.

23 Claims, No Drawings

(56) References Cited

U.S. PATENT DOCUMENTS

2008/0013156 A1  1/2008  Whitesides et al.
2008/0038669 A1  2/2008  Kakino

FOREIGN PATENT DOCUMENTS

| JP | 2007-326904 A | 12/2007 |
|---|---|---|
| WO | WO-94 00797 | 1/1994 |
| WO | WO-99 10767 | 3/1999 |
| WO | WO-2005 017046 | 2/2005 |
| WO | WO-2006 126120 | 11/2006 |
| WO | WO-2007 048721 | 5/2007 |
| WO | WO-2008 003604 | 1/2008 |
| WO | WO-2008 003619 | 1/2008 |
| WO | WO 2008003604 A2 * | 1/2008 |

OTHER PUBLICATIONS

Li, N. et al., "Synthesis of third-order nonlinear opitical polyacrylates containing an azobenzene side chain via atom transfer radical polymerization," Dyes and Pigments, 2009, vol. 80, pp. 73-79.

Kawatsuki, N. et al., "New photocrosslinkable copolymers for nonlinear optical applications," Makromol. Chem. Rapid Commun. 1993, vol. 14, pp. 625-632.

International Search Report for PCT/EP2010/000549 dated Aug. 20, 2010.

Official Action related to corresponding Japanese Patent Application No. 2011-548581 dated Jun. 11, 2013.

\* cited by examiner

PARTICLES FOR ELECTROPHORETIC DISPLAYS

This invention relates to coloured polymer particles, preferably with surface functionality for charge retention, a process for their preparation, the use of these particles for the preparation of an electrophoretic device, colour electrophoretic displays comprising such particles, and new water-soluble dyes.

In recent years a need has developed for low power, low cost and light weight display devices. EPDs (Electrophoretic Displays) can fulfil this requirement. One use of EPDs is for electronic paper. It is imperative that once an image is displayed, the image can be retained for a long period of time without further voltage being applied. Hence, this fulfils the requirements of low power use, and means an image can be visible until another image is required.

An EPD generally comprises charged electrophoretic particles dispersed between two substrates, each comprising one or more electrodes. The space between the electrodes is filled with a dispersion medium which is a different colour to the colour of the particles. If a voltage is applied between the electrodes, charged particles move to the electrode of opposite polarity. The particles can cover the observer's side electrode, so that a colour identical to the colour of the particles is displayed when an image is observed from the observer's side. Any image can be observed using a multiplicity of pixels.

Available technologies of EPDs include electronic paper, commercially used in electronic books. This application uses black and white or light colour. However, the main disadvantage of state of the art EPDs is the lack of a bright full colour system.

The use of different coloured particles in a single pixel has been exemplified in recent patent literature (U.S. Pat. No. 7,304,634, GB 2 438 436, US 2007/0268244), but all of these approaches require the use of complex cell structures and drive schemes.

Special coloured particles for EPDs and processes for their preparation are disclosed in US 2007/0297038, US 2008/0013156, U.S. Pat. No. 6,822,782, WO 2007/048721, WO 2008/003619, WO 2008/003604, US 2005/0267263, WO 2006/126120, and J. Nanosci. Nanotechn. 2006, Vol. 6, No. 11, p. 3450-3454. Two particle system comprising inorganic and resin particles are also known (EP 1 491 941). These coloured particles are only achievable by complicated processes and/or they are only suitable for specific applications. Similar coloured particles and their preparation processes are known for analytical techniques (U.S. Pat. No. 5,607,864 and U.S. Pat. No. 5,716,855) and as toner particles for ink jet printing (U.S. Pat. No. 4,613,559).

There is a need for a simple preparation of charged coloured particles which can be easily dispersed in non-polar media, show electrophoretic mobility and which do not leach colour in a dispersant.

Therefore, the object of this invention is to provide electro-optically active media for colour electrophoretic displays and specifically engineered coloured particles for use in such media.

This object is solved by a process for the preparation of coloured polymer particles for use in electrophoretic devices comprising the steps of a) the reaction of at least one polymerisable dye, at least one monomer, at least one initiator, preferably at least one steric stabiliser, and optionally at least one charged co-monomer in a non-aqueous solvent, and preferably b) washing the coloured polymer particles, by these particles per se, by the use of these particles for the preparation of an electrophoretic device, by colour electrophoretic displays comprising such particles, and new water-soluble dyes.

The subject matter of this invention relates specifically to the use of specifically engineered polymer particles and their dispersion in dielectric organic media to produce a composition preferably suitable as the electrically switchable component of a full colour e-paper or electrophoretic display.

It relates more specifically to the synthesis of polymer particles, their surface modification with covalently bonded substituents to promote dispersability and the holding of a charge and to the physical and irreversible entrapment of a polymerizable dye to give colour to the particles.

It also relates specifically to dispersions of the afore-mentioned polymer particles in dielectric organic media, which enable electrophoretic switching of the particles in an applied electric field.

Advantages of the polymer particles according to the invention may be, in particular:
- excellent control of particle size, monodisperse size distribution with a small diameter range of 50-500 nm, preferably 150-400 nm, for image quality, and/or
- a glassy polymer nature for optical clarity and colour compatibility, and/or
- a homogeneous crosslinked network structure for solvent resistance, and/or
- a non-swelling nature when dispersed in EPD solvent media, impact strength, hardness, and/or
- dispersible in a non polar continuous phase that is the most used media for EPD, and/or
- high electrophoretic mobility in dielectric media, and/or
- technique is universally applicable for dye incorporation across all colours, and/or
- accurate zeta potential is possible, and/or
- all colours have same density (good for sedimentation/agglomeration performance), and/or
- excellent switching behaviour, faster response times at comparable voltages, and/or
- consistent surface properties, and/or
- good reproducibility, and/or
- densities close to that of the carrier fluid.

The main advantages of the present invention are that it is possible to prepare particles of appropriate colours e.g. red, green and blue or a combination of cyan, magenta and yellow, and to be able to prepare coloured particles of a desired size and which have a high mono-dispersity, and which preferably incorporate a charge, to enable electrophoretic movement.

It is especially advantageous that the present process is a one-step reaction to provide coloured particles suitable for EPD enabling a cost effective production process.

Use of a polymerisable dye in the formative stage of the particle, enables the dye to become irreversibly bound with the co-monomers and become an intrinsic part of the particle. Since the dye is covalently bound to the co-monomers in the particle, it is highly unlikely to leach into any solvent suitable for EPD.

In addition, the dye can be specifically designed to give a desired suitable colour, e.g. cyan or red. The polymerisable group on the dye can be easily modified (e.g. methacrylate, acrylate, etc.) so that an appropriate dye monomer can react with other monomers to form the particle.

The present invention avoids the use of aqueous medium as previously reported for the syntheses of coloured polymer particles for EPD. Whereas preparation in aqueous medium has obvious advantages in terms of health, safety and environmental terms, ultimately the coloured polymer particles have to be redispersed in a non-aqueous, non-polar medium for use in EPD. If the particles are prepared in water, then usually a long and power consuming process such as freeze drying or spray drying is required to remove the water. The present invention avoids such time consuming steps and the coloured polymer particles do not have to be redispersed in to a suitable non-polar solvent for EPD. This route also avoids introducing unwanted traces of water into the EPD dispersion. Therefore, the inventive process provides a one-step reaction to prepare coloured particles suitable for EPD, without the requirement of freeze or spray drying enabling a cost effective production process. No transfer of solvents is required.

The present invention provides an easy way for the production of coloured polymeric particles, wherein charge and colour can be controlled independently from each other. It is especially advantageous that the inventive particles do not leach any colour into a non-polar solvent used a carrier fluid in EPD even over a long time period.

In design and synthesis of particles for EPD, the present invention provides the opportunity to manipulate colour, charge, size, mono-dispersity etc. independently in order to produce particles with all the desired features for coloured EPD.

An essential component of the present invention is a polymerisable dye. In general the polymerisable dyes may be solvent soluble or water soluble and they may be anionic, cationic or neutral. In one instance a dye is used, which is both covalently bonded into the particle and preferentially soluble in the particle. This approach provides maximum possible colour fastness.

The function of the polymerisable dye is to colour the particle. The polymerisable dye consists of a chromophore, one or more polymerisable groups, optional linker groups (spacers), and optional groups to modify physical properties (like solubility, light fastness, etc.) and optionally charged group(s).

The polymerisable dye preferably comprises a chromophoric group and a functional group or plurality of functional groups selected from polymerisable groups, e.g. methacrylates, acrylates, methacrylamides, acrylonitriles, α-substituted acrylates, styrenes and vinyl ethers, vinyl esters, propenyl ethers, oxetanes and epoxys etc., in particular methacrylates and acrylates.

The polymerisable group may be attached directly to the chromophoric group or may be attached through a linker group. An example of a suitable linker group is an optionally substituted alkyl chain, a polyether alkyl chain, a cycloalkyl or aromatic ring, heteroaromatic ring or a combination thereof.

The chromophoric group preferably comprises of conjugated aromatic (including heteroaromatic) and/or multiple bonds including: azo (including monoazo, bisazo, trisazo, linked azos etc), metallised azo, anthraquinone, pyrroline, phthalocyanine, polymethine, aryl-carbonium, triphendioxazine, diarylmethane, triarylmethane, anthraquinone, phthalocyanine, methine, polymethine, indoaniline, indophenol, stilbene, squarilium, aminoketone, xanthene, fluorone, acridene, quinolene, thiazole, azine, induline, nigrosine, oxazine, thiazine, indigoid, quinonioid, quinacridone, lactone, benzodifuranone, flavonol, chalone, polyene, chroman, nitro, naphtholactam, formazene or indolene group or a combination of two or more such groups.

Preferred chromophoric groups are azo groups (especially monoazo, and bisazo), anthraquinone and phthalocyanine groups.

Preferably the polymerisable dye comprises a chromophoric group and one or more functional groups selected from an acrylate or methacrylate backbone.

A polymerisable dye may contain a single chromophore, for example with bright yellow, magenta or cyan colours and self shade blacks. However, it may also contain mixed covalently attached chromophores for example to obtain a black colour, by covalently attached brown and blue or yellow, magenta and cyan. Green can be obtained by yellow and cyan etc. Extended conjugated chromophores can also be used to obtain some shades. For example, bis- and trisazo compounds can be used to obtain blacks and other duller shades (navy blue, brown, olive green, etc).

Mixtures of polymerisable dyes can also be used to obtain the correct particle shade; for example a black from single component mixtures of brown and blue or yellow, magenta and cyan pre-polymerised dyes. Similarly shades can be tuned for example by adding small quantities of separate polymerisable dyes to modify the colour of the particles (e.g. 95% yellow and 5% cyan to get a greener yellow shade).

Modified polymerisable dyes (with reactive group(s)) from the application groups of reactive (anionic), direct (anionic), acidic (anionic) and basic (cationic) dyes as designated by the Colour Index (published by The Society of Dyers and Colorists with the American Association of Textile Chemists and Colorists e.g. $3^{rd}$ edition 1982) are preferred.

Preferable examples of polymerisable dyes are summarised in the following Tables:

TABLE 1

Examples of Solvent Soluble Reactive Dyes, Dye Examples 1-8 are commercially available from Sigma-Aldrich chemical company 1  Disperse red 1 acrylate 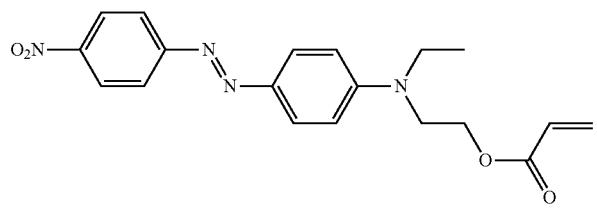 [SMILES: C=CC(=O)OCCN(CC)c1ccc(/N=N/c2ccc([N+](=O)[O-])cc2)cc1]

TABLE 1-continued
Examples of Solvent Soluble Reactive Dyes, Dye Examples 1-8
are commercially available from Sigma-Aldrich chemical company
| | | |
|---|---|---|
| 2 | Disperse Red 1 methacrylate | 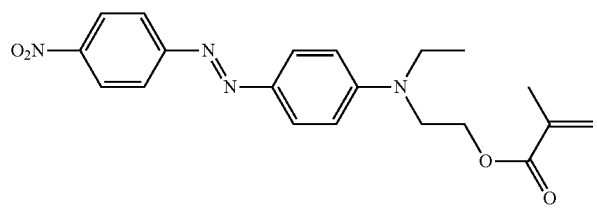 [SMILES: C=C(C)C(=O)OCCN(CC)c1ccc(/N=N/c2ccc([N+](=O)[O-])cc2)cc1] |
| 3 | Disperse Red 13 acrylate | 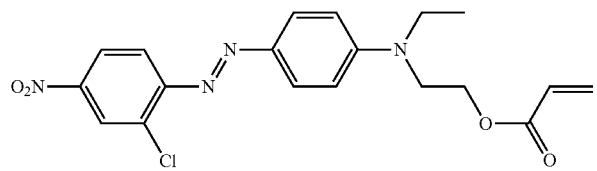 [SMILES: C=CC(=O)OCCN(CC)c1ccc(/N=N/c2ccc([N+](=O)[O-])cc2Cl)cc1] |
| 4 | Disperse Red 13 methacrylate | 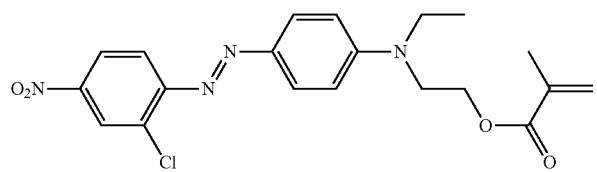 [SMILES: C=C(C)C(=O)OCCN(CC)c1ccc(/N=N/c2ccc([N+](=O)[O-])cc2Cl)cc1] |
| 5 | Disperse Yellow 7 methacrylate | 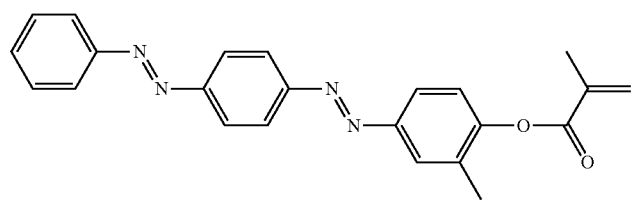 [SMILES: C=C(C)C(=O)Oc1ccc(/N=N/c2ccc(/N=N/c3ccccc3)cc2)cc1C] |
| 6 | Disperse Yellow 7 acrylate | 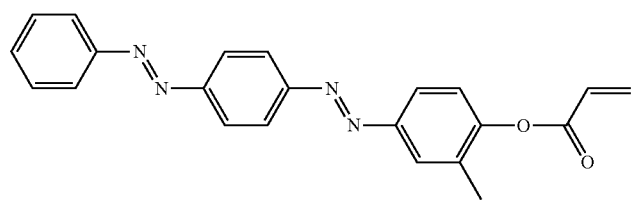 |
| 7 | Disperse Orange 3 acrylamide | 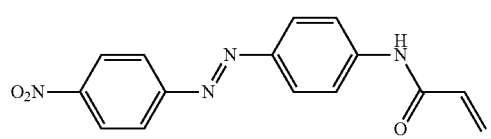 [SMILES: C=CC(=O)Nc1ccc(/N=N/c2ccc([N+](=O)[O-])cc2)cc1] |
| 8 | Disperse Orange 3 methacrylamide | 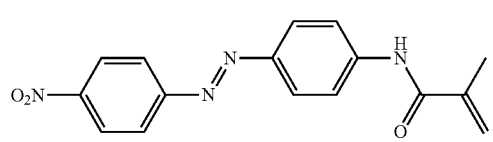 [SMILES: C=C(C)C(=O)Nc1ccc(/N=N/c2ccc([N+](=O)[O-])cc2)cc1] |
| 9 | | 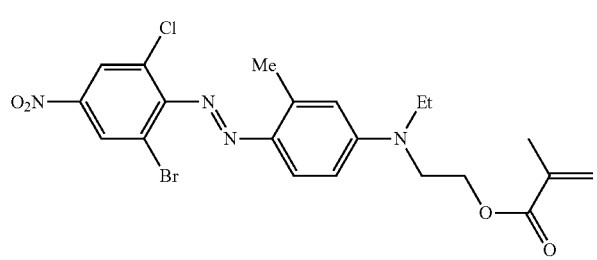 [SMILES: C=C(C)C(=O)OCCN(CC)c1ccc(/N=N/c2c(Cl)cc([N+](=O)[O-])cc2Br)c(C)c1] |

TABLE 1-continued
Examples of Solvent Soluble Reactive Dyes, Dye Examples 1-8
are commercially available from Sigma-Aldrich chemical company
10 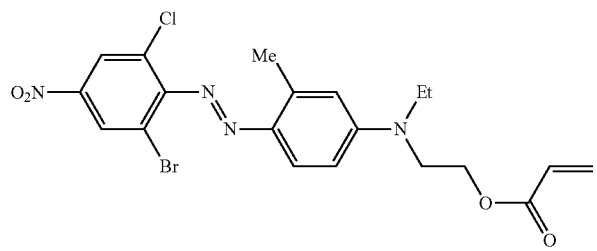 [SMILES: C=CC(=O)OCCN(CC)c1ccc(/N=N/c2c(Cl)cc([N+](=O)[O-])cc2Br)c(C)c1]
11 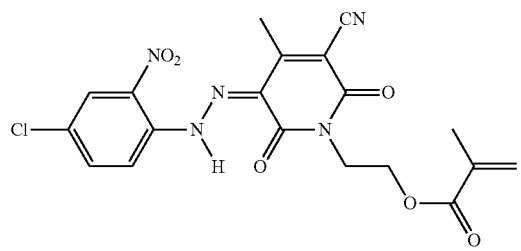 [SMILES: C=C(C)C(=O)OCCN1C(=O)C(C#N)=C(C)/C(=N/Nc2ccc(Cl)cc2[N+](=O)[O-])C1=O]
12 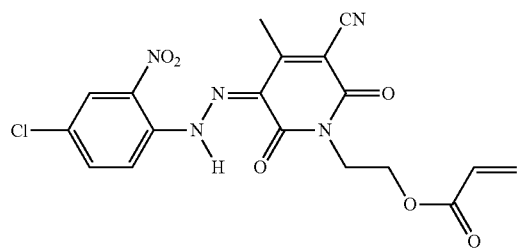 [SMILES: C=CC(=O)OCCN1C(=O)C(C#N)=C(C)/C(=N/Nc2ccc(Cl)cc2[N+](=O)[O-])C1=O]
13 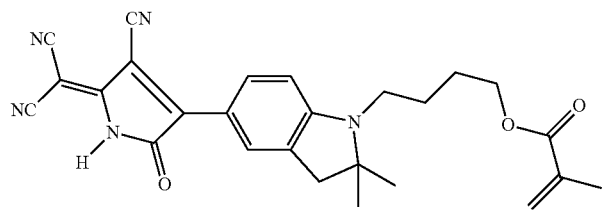 [SMILES: C=C(C)C(=O)OCCCCN1c2ccc(C3=C(C#N)C(=C(C#N)C#N)NC3=O)cc2CC1(C)C]
14 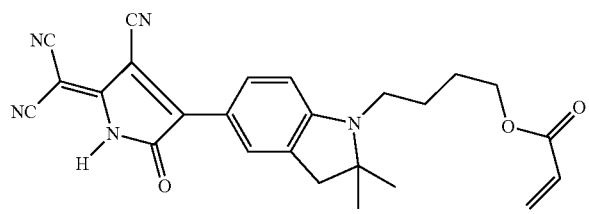 [SMILES: C=CC(=O)OCCCCN1c2ccc(C3=C(C#N)C(=C(C#N)C#N)NC3=O)cc2CC1(C)C]
15 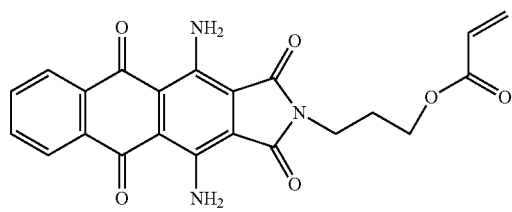 [SMILES: C=CC(=O)OCCCn1c(=O)c2c(N)c3c(=O)c4ccccc4c(=O)c3c(N)c2c1=O]

TABLE 1-continued
Examples of Solvent Soluble Reactive Dyes, Dye Examples 1-8
are commercially available from Sigma-Aldrich chemical company
16 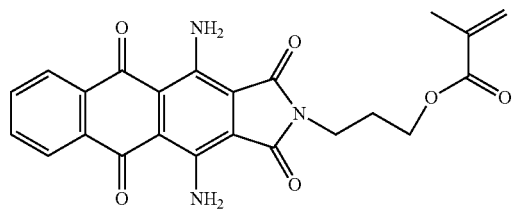 [SMILES: C=C(C)C(=O)OCCCn1c(=O)c2c(N)c3c(=O)c4ccccc4c(=O)c3c(N)c2c1=O]
17 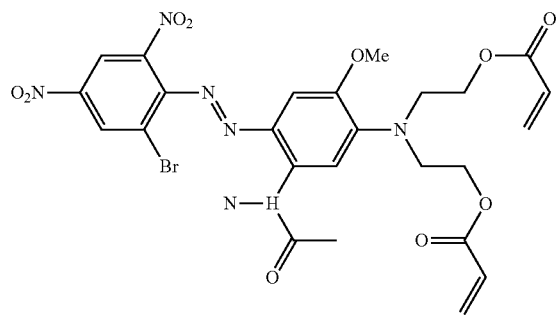
18 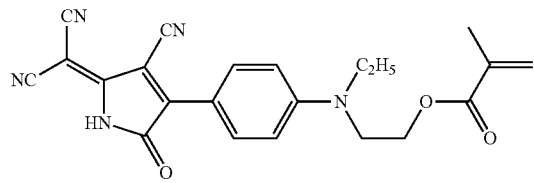 [SMILES: C=C(C)C(=O)OCCN(CC)c1ccc(C2=C(C#N)C(=C(C#N)C#N)NC2=O)cc1]
19 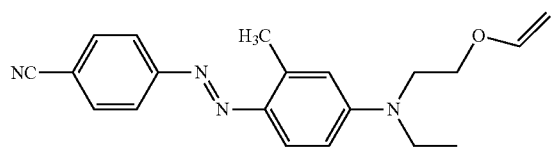 [SMILES: C=COCCN(CC)c1ccc(/N=N/c2ccc(C#N)cc2)c(C)c1]
20 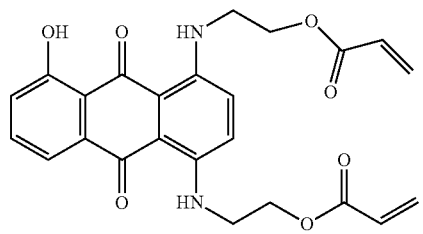 [SMILES: C=CC(=O)OCCNc1ccc(NCCOC(=O)C=C)c2c1C(=O)c1cccc(O)c1C2=O]
21 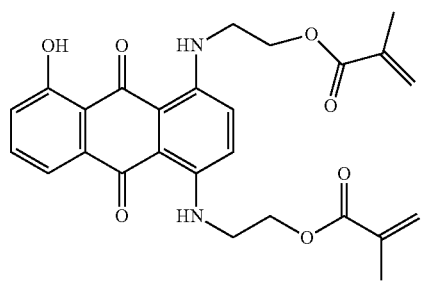 [SMILES: C=C(C)C(=O)OCCNc1ccc(NCCOC(=O)C(=C)C)c2c1C(=O)c1cccc(O)c1C2=O]

TABLE 1-continued

Examples of Solvent Soluble Reactive Dyes, Dye Examples 1-8
are commercially available from Sigma-Aldrich chemical company 22 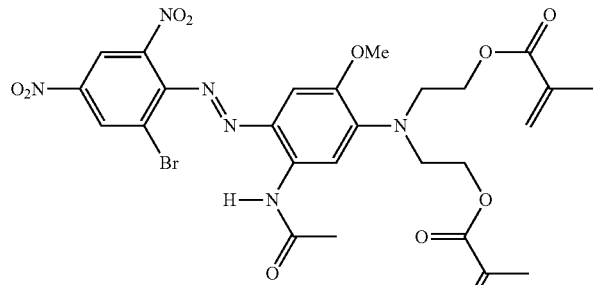

23 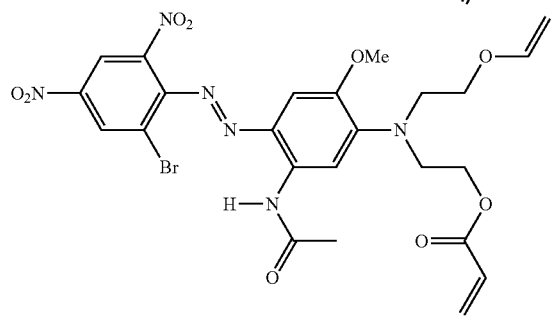

Cationic polymerisable dyes contain a covalently attached group or groups which have a positive charge in the application or contain a positive charge in the chromophore group. They can be derived from protonation or quaternation of nitrogen, phosphorous, oxygen or sulphur atoms or groups containing them, for example heteroaromatic (thiazole, imidazole) delocalised nitrogen bases (guanidine etc). Associated anions preferably have a single charge and can be halogen (F, Cr, Br etc), monobasic acid (oxo) anions (acetate, propionate, lactate, methane sulphonate, p-toluenesulphonate, hydroxide, nitrate, etc).

Preferred examples of water soluble cationic polymerisable dyes are listed in Table 2 (counter ion $MeOSO_3^-$, also preferably suitable are $F$, $Cl^-$, $Br$, acetate)

TABLE 2

| 1 | Basic blue 41 methacrylate | 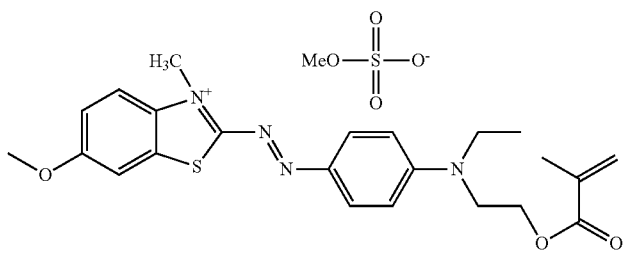 [SMILES: C=C(C)C(=O)OCCN(CC)c1ccc(/N=N/c2sc3cc(OC)ccc3[n+]2C)cc1 ; COS(=O)(=O)[O-]] |
| 2 | | 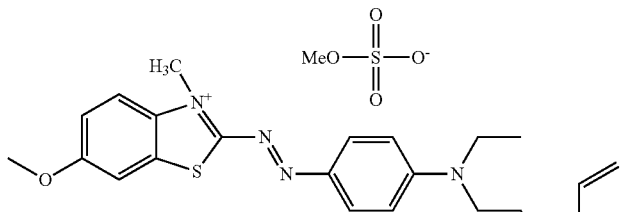 |
| 3 | | 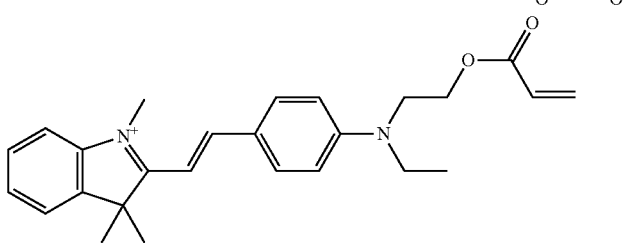 |

TABLE 2-continued

4
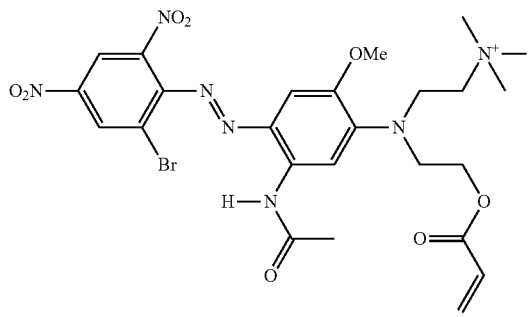 [SMILES: C=CC(=O)OCCN(CC[N+](C)(C)C)c1cc(NC(C)=O)c(/N=N/c2c(Br)cc([N+](=O)[O-])cc2[N+](=O)[O-])cc1OC]

Anionic polymerisable dyes contain a covalently attached group or groups which have a negative charge in the application and can be derived from deprotonation of an acidic group for example sulphonic, carboxylic, phosphonic acids. Associated cations preferably have a single charge and can be metallic ($Li^+$, $Na^+$, $K^+$ etc), charged nitrogen ($NH_4^+$, $NEt_3H^+$, $NEt_4^+$, $NMe_4^+$, imidazolium cation etc), positively charged phosphorous, sulphur etc. Preferred examples of water soluble anionic dyes are the $Na^+$, $NH_4^+$, $NEt_4^+$ salts of the acids.

Another preferred example is $CuPc(SO_3^-)_n(SO_2NHCH_2CH_2COOCMe{=}CH_2)_m$ where CuPc is copper phthalocyanine and $m>1$, $n>1$, $m+n>2$ and $<16$ and preferably in the range of 2-5.

Preferred dye acids are listed in Table 3. Preferred water dispersible neutral dyes are listed in Table 4.

TABLE 3

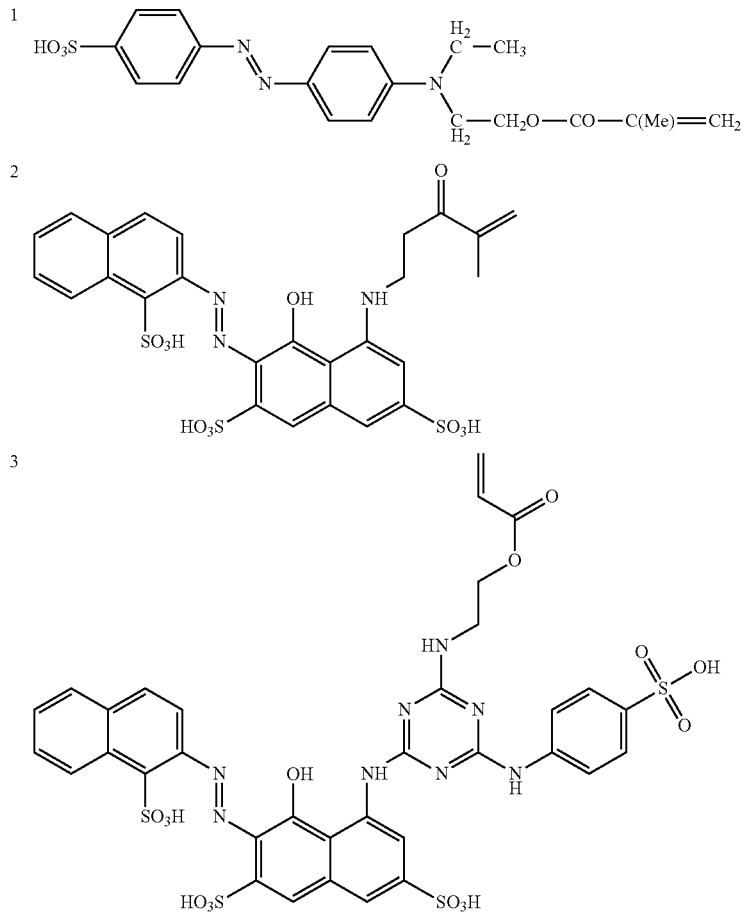

TABLE 4

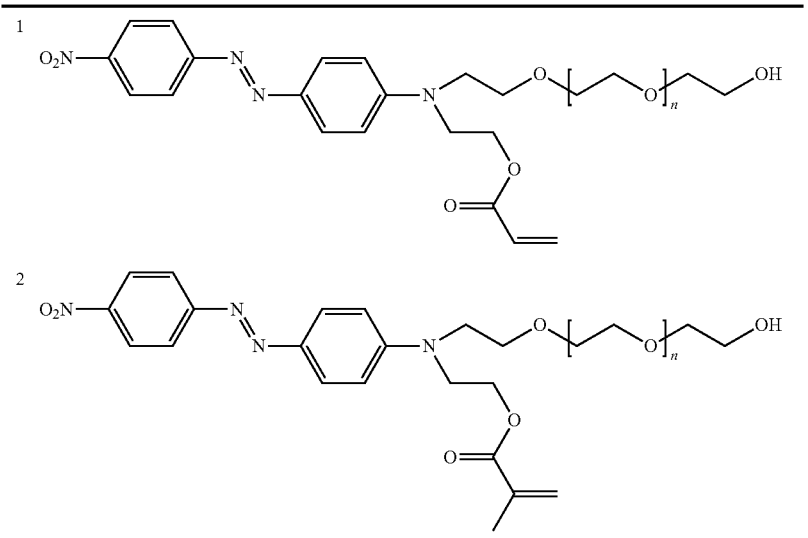

Preferably polymerisable water-soluble dye monomers are used. This is advantageous, because such dyes do not dissolve in the non-aqueous medium and are strongly fixed in the polymer particles. Thus if traces of unpolymerised dye exist in the particle after it has been formed, it will not leach in the EPD fluid.

Preferably polymerisable water-soluble dye monomers such as the acrylate or methacrylate derivatives of cationic Basic Blue 41 (listed in Table 2 as numbers 1 and 2) and similar dyes according to Formula 1 can be used.

Formula 1

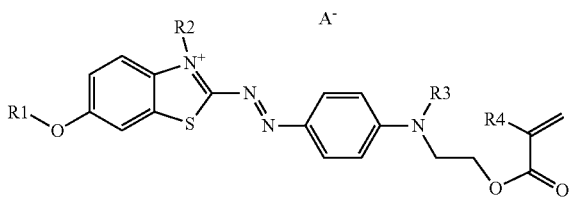

wherein R1, R2, R3=alkyl, preferably C1-C4 alkyl

R4=H or $CH_3$ $A^-$=halogen, monobasic acid (oxo) anions, preferably acetate, propionate, lactate, methane sulphonate, p-toluene-sulphonate, hydroxide, or nitrate, preferably with R1, R2, R4=$CH_3$ and R3=$C_2H_5$ and $A^-$=methane sulfonate. An especially preferred polymerisable water-soluble dye is the methacrylate derivative of cationic Basic Blue 41.

The preparation of such polymerisable dyes is exemplified for the methacrylate derivative of cationic Basic Blue 41 which can be prepared by a 3-step reaction as shown in the following scheme:

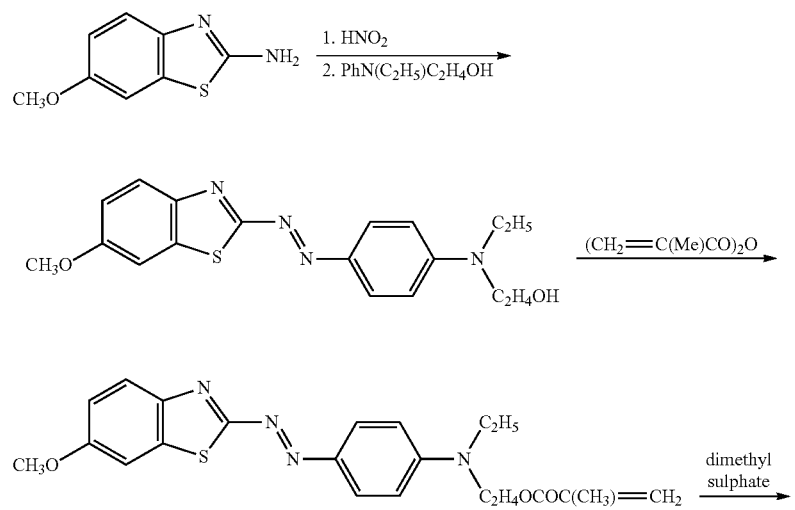

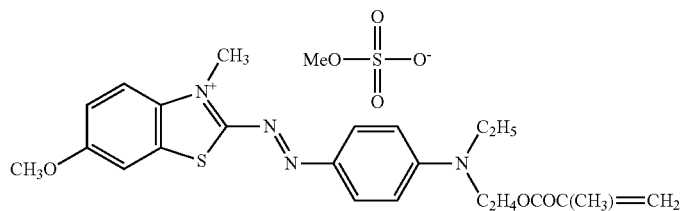

Another unexpected advantage for the inventive process is that if a cationic or anionic dye is used, a charge is simultaneously introduced in to the particles, which is missing if a neutral dye is used. This is preferred for zeta potential and mobility in an EPD cell.

But it is also possible to polymerise solvent soluble dyes such as commercially available Disperse Red 1 methacrylate. Also preferred are dyes having a structure like dyes 11 or 12 of Table 1 or similar dyes as shown in Formula 2.

Formula 2

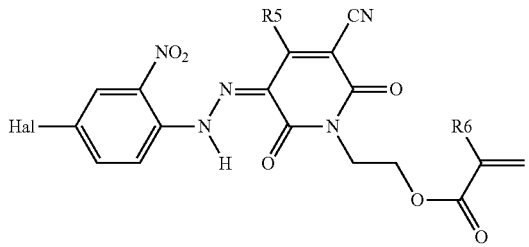

wherein R5=C1-C4 alkyl, preferably CH$_3$,
R6=H or CH3, preferably CH$_3$,
Hal=halogen, preferably Cl.

The preparation of such polymerisable dyes is exemplified for the methacrylate derivative (dye 11 of Table 1) which can be prepared by a 3-step reaction as shown in the following scheme:

It is also possible to polymerise dyes having a structure like dye 1 of Table 3 as shown in Formula 3.

Formula 3

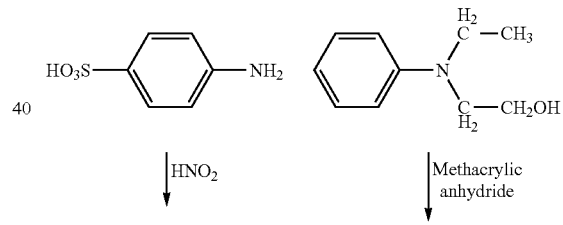

wherein R7=alkyl, preferably C1-C4 alkyl, especially CH$_3$,
R8=H or CH3, preferably CH$_3$.

The preparation of such polymerisable dyes is exemplified for the methacrylate derivative (dye 1 of Table 3) which can be prepared by a 3-step reaction as shown in the following scheme:

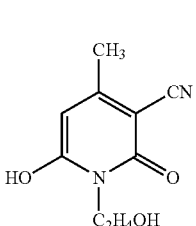

↓ HNO$_2$

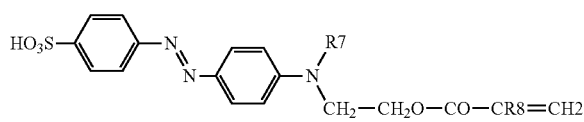

↓ Methacrylic anhydride

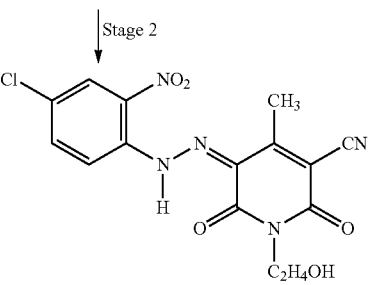

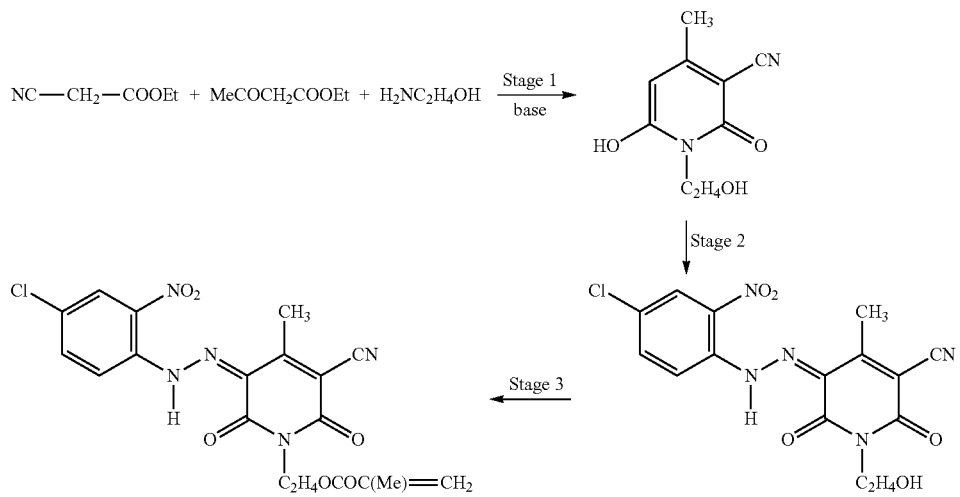

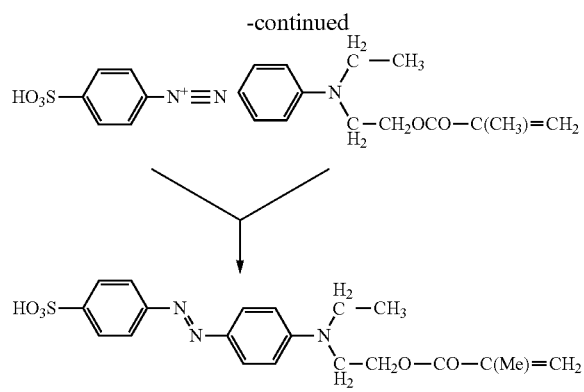

Preferably acrylate or methacrylate derivatives of Disperse red 1, dyes of Formula 1, especially methacrylate or acrylate derivative of cationic Basic Blue 41, dyes of Formula 2, especially with R5 and R6=CH$_3$ and Hal=Cl, and dyes of Formula 3, especially with R7 and R8=CH$_3$ are used as polymerisable dyes for the invention. Especially preferred are Disperse red 1 methacrylate, methacrylate derivative of cationic Basic Blue 41, and dye of Formula 3 with R7 and R8=CH$_3$.

The coloured polymer particles of the invention can be prepared in a simple 1-step reaction in a non-aqueous, preferably non-polar medium. The preferred solvents are non-polar hydrocarbon solvents, especially such used in EPD fluids, i.e. the Isopar series (Exxon-Mobil), Norpar, Shell-Sol (Shell), Sol-Trot (Shell), naphtha, and other petroleum solvents, as well as long chain alkanes such as dodecane, tetradecane, decane and nonane. Especially preferred is dodecane. Preferably the coloured polymer particles are simply separated from the reaction suspension by filtration, preferably by pouring the suspension through a pore size filter, i.e. a 0.1 µm pore size filter, or the particles can be cleaned by centrifuging.

The selection of the polymerisation conditions depends on the required size and size distribution of the particles. Adjustment of polymerisation conditions is well known to someone skilled in the art.

Preferably, a batch polymerisation process is used wherein all reactants are completely added at the outset of the polymerisation process. In such process only relatively few variables have to be adjusted for a given formulation. Preferred changes which can be made in such cases are to the reaction temperature, reactor design and the type and speed of stirring. Thus, a batch polymerisation process is used for manufacture versus a semi-continuous batch process because of limited versatility and simple evaluations of reaction formulation.

A further advantage of the process according to the invention is that it is surfactant-free. Protective colloids (water-soluble polymers) and surfactants are usually key formulation variables in emulsion polymerisation because of their impact on the intraparticle stability and particle size control but they may have a detrimental effect on the electrophoretic response.

Preferably the polymerisation according to the invention is a free radical polymerisation.

Usually, a monomer composition according to the invention comprises at least one polymerisable dye, at least one monomer, at least one initiator, preferably at least one steric stabiliser, and optionally at least one charged co-monomer in a non-aqueous solvent Preferably, a monomer composition according to the invention comprises polymerizable dye, at least one monomer, a steric stabiliser, an initiator, and a non-aqueous, non-polar solvent.

The monomers described in the following for preparation of the polymeric particles can be combined with the polymerisable dyes to produce a polymerisable dye/monomer mixture and/or the monomers can be incorporated stepwise into the polymerisable mixture to produce special effects, for example a core-shell effect so that there is more dye on the shell of the particles. Particularly preferable are monomers which are similar to the polymerisable dye, such as methyl methacrylate with disperse red 1 acrylate.

The particles can be prepared from most monomer types, in particular methacrylates, acrylates, methacrylamides, acrylonitriles, α-substituted acrylates, styrenes and vinyl ethers, vinyl esters, propenyl ethers, oxetanes and epoxys but would typically be prepared from largest percentage to be monomer, then cross-linker, and include a charged monomer (e.g. quaternised monomer).

The following are all examples which could be used and which are commercially available from the Sigma-Aldrich chemical company. Mixtures of monomers may also be used.
Methacrylates:
Methyl methacrylate (MMA), Ethyl methacrylate (EMA), n-Butyl methacrylate (BMA), 2-Aminoethyl methacrylate hydrochloride, Allyl methacrylate, Benzyl methacrylate, 2-Butoxyethyl methacrylate, 2-(tert-Butylamino)ethyl methacrylate, Butyl methacrylate, tert-Butyl methacrylate, Caprolactone 2-(methacryloyloxy)ethyl ester, 3-Chloro-2-hydroxypropyl methacrylate, Cyclohexyl methacrylate, 2-(Diethylamino)ethyl methacrylate, Di(ethylene glycol) methyl ether methacrylate, 2-(Dimethylamino)ethyl methacrylate, 2-Ethoxyethyl methacrylate, Ethylene glycol dicyclopentenyl ether methacrylate, Ethylene glycol methyl ether methacrylate, Ethylene glycol phenyl ether methacrylate, 2-Ethylhexyl methacrylate, Furfuryl methacrylate, Glycidyl methacrylate, Glycosyloxyethyl methacrylate, Hexyl methacrylate, Hydroxybutyl methacrylate, 2-Hydroxyethyl methacrylate, 2-Hydroxyethyl methacrylate, Hydroxypropyl methacrylate Mixture of hydroxypropyl and hydroxyisopropyl methacrylates, 2-Hydroxypropyl 2-(methacryloyloxy) ethyl phthalate, Isobornyl methacrylate, Isobutyl methacrylate, 2-Isocyanatoethyl methacrylate, Isodecyl methacrylate, Lauryl methacrylate, Methacryloyl chloride, Methacrylic acid, 2-(Methylthio)ethyl methacrylate, mono-2-(Methacryloyloxy)ethyl maleate, mono-2-(Methacryloyloxy)ethyl succinate, Pentabromophenyl methacrylate, Phenyl methacrylate, Phosphoric acid 2-hydroxyethyl methacrylate ester, Stearyl methacrylate, 3-Sulfopropyl methacrylate potassium salt, Tetrahydrofurfuryl methacrylate, 3-(Trichlorosilyl)propyl methacrylate, Tridecyl methacrylate, 3-(Trimethoxysilyl) propyl methacrylate, 3,3,5-Trimethylcyclohexyl methacrylate, Trimethylsilyl methacrylate, Vinyl methacrylate. Preferably Methyl methacrylate (MMA), Methacrylic acid, Ethyl methacrylate (EMA), and/or n-Butyl methacrylate (BMA) are used.
Acrylates:
Acrylic acid, 4-Acryloylmorpholine, [2-(Acryloyloxy) ethyl]trimethylammonium chloride, 2-(4-Benzoyl-3-hydroxyphenoxy)ethyl acrylate, Benzyl 2-propylacrylate, 2-Butoxyethyl acrylate, Butyl acrylate, tert-Butyl acrylate, 2-[(Butylamino)carbonyl]oxy]ethyl acrylate, tert-Butyl 2-bromoacrylate, 4-tert-Butylcyclohexyl acrylate, 2-Carboxyethyl acrylate, 2-Carboxyethyl acrylate oligomers anhydrous, 2-(Diethylamino)ethyl acrylate, i(ethylene glycol) ethyl ether acrylate technical grade, Di(ethylene glycol)

2-ethylhexyl ether acrylate, 2-(Dimethylamino)ethyl acrylate, 3-(Dimethylamino)propyl acrylate, Dipentaerythritol penta-/hexa-acrylate, 2-Ethoxyethyl acrylate, Ethyl acrylate, 2-Ethylacryloyl chloride, Ethyl 2-(bromomethyl)acrylate, Ethyl cis-(β-cyano)acrylate, Ethylene glycol dicyclopentenyl ether acrylate, Ethylene glycol methyl ether acrylate, Ethylene glycol phenyl ether acrylate, Ethyl 2-ethylacrylate, 2-Ethylhexyl acrylate, Ethyl 2-propylacrylate, Ethyl 2-(trimethylsilylmethyl)acrylate, Hexyl acrylate, 4-Hydroxybutyl acrylate, 2-Hydroxyethyl acrylate, 2-Hydroxy-3-phenoxypropyl acrylate, Hydroxypropyl acrylate, Isobornyl acrylate, Isobutyl acrylate, Isodecyl acrylate, Isooctyl acrylate, Lauryl acrylate, Methyl 2-acetamidoacrylate, Methyl acrylate, Methyl α-bromoacrylate, Methyl 2-(bromomethyl)acrylate, Methyl 3-hydroxy-2-methylenebutyrate, Octadecyl acrylate, Pentabromobenzyl acrylate, Pentabromophenyl acrylate, Poly(ethylene glycol) methyl ether acrylate, Poly(propylene glycol) acrylate, Poly(propylene glycol) methyl ether acrylate Soybean oil, epoxidized acrylate, 3-Sulfopropyl acrylate potassium salt, Tetrahydrofurfuryl acrylate, 3-(Trimethoxysilyl)propyl acrylate, 3,5,5-Trimethylhexyl acrylate. Preferably Methyl acrylate, acrylic acid, Ethyl acrylate (EMA), and/or n-Butyl acrylate (BMA) are used.

Acrylamides:

2-Acrylamidoglycolic acid, 2-Acrylamido-2-methyl-1-propanesulfonic acid, 2-Acrylamido-2-methyl-1-propanesulfonic acid sodium salt solution, (3-Acrylamidopropyl)trimethylammonium chloride solution, 3-Acryloylamino-1-propanol solution purum, N-(Butoxymethyl)acrylamide, N-tert-Butylacrylamide, Diacetone acrylamide, N,N-Dimethylacrylamide, N-[3-(Dimethylamino)propyl]methacrylamide, N-Hydroxyethyl acrylamide, N-(Hydroxymethyl) acrylamide, N-(Isobutoxymethyl)acrylamide, N-Isopropylacrylamide, N-Isopropylmethacrylamide, Methacrylamide, N-Phenylacrylamide, N-[Tris(hydroxymethyl)methyl]acrylamide, Styrenes Styrene, Divinyl benzene, 4-Acetoxystyrene, 4-Benzyloxy-3-methoxystyrene, 2-Bromostyrene, 3-Bromostyrene, 4-Bromostyrene, α-Bromostyrene, 4-tert-Butoxystyrene, 4-tert-Butylstyrene, 4-Chloro-α-methylstyrene, 2-Chlorostyrene, 3-Chlorostyrene, 4-Chlorostyrene, 2,6-Dichlorostyrene, 2,6-Difluorostyrene, 1,3-Diisopropenylbenzene, 3,4-Dimethoxystyrene, α,2-Dimethylstyrene, 2,4-Dimethylstyrene, 2,5-Dimethylstyrene, N,N-Dimethylvinylbenzylamine, 2,4-Diphenyl-4-methyl-1-pentene, 4-Ethoxystyrene, 2-Fluorostyrene, 3-Fluorostyrene, 4-Fluorostyrene, 2-Isopropenylaniline, 3-Isopropenyl-α,α-dimethylbenzyl isocyanate, Methylstyrene, α-Methylstyrene, 3-Methylstyrene, 4-Methylstyrene, 3-Nitrostyrene, 2,3,4,5,6-Pentafluorostyrene, 2-(Trifluoromethyl)styrene, 3-(Trifluoromethyl)styrene, 4-(Trifluoromethyl)styrene, 2,4,6-Trimethylstyrene. Preferably Styrene and/or Divinyl benzene are used.

Vinyl Groups

3-Vinylaniline, 4-Vinylaniline, 4-Vinylanisole, 9-Vinylanthracene, 3-Vinylbenzoic acid, 4-Vinylbenzoic acid, Vinylbenzyl chloride, 4-Vinylbenzyl chloride, (Vinylbenzyl)trimethylammonium chloride, 4-Vinylbiphenyl, 2-Vinylnaphthalene, 2-Vinylnaphthalene, Vinyl acetate, Vinyl benzoate, Vinyl 4-tert-butylbenzoate, Vinyl chloroformate, Vinyl chloroformate, Vinyl cinnamate, Vinyl decanoate, Vinyl neodecanoate, Vinyl neononanoate, Vinyl pivalate, Vinyl propionate, Vinyl stearate, Vinyl trifluoroacetate, Other monomers which may be used are those which have groups to help stabilisation of the particles, e.g. Poly(ethylene glycol) methyl ether acrylate, Poly(ethylene glycol) phenyl ether acrylate, lauryl methacrylate, Poly(ethylene glycol) methyl ether acrylate, Poly(propylene glycol) methyl ether acrylate, Lauryl acrylate and fluorinated monomers of above.

Some of the monomers have groups for further reaction if so desired, e.g. Glycidyl ethacrylate, 2-Hydroxyethyl methacrylate.

The following compounds can be used as intraparticle crosslinking monomers for solubility control and solvent swelling resistance: ethylene glycol dimethacrylate (EGDMA), allyl methacrylate (ALMA), divinyl benzene, Bis[4-(vinyloxy)butyl]adipate, Bis[4-(vinyloxy)butyl]1,6-hexanediylbiscarbamate, Bis[4-(vinyloxy)butyl] isophthalate, Bis[4-(vinyloxy)butyl] (methylenedi-4,1-phenylene)biscarbamate, Bis[4-(vinyloxy)butyl]succinate, Bis[4-(vinyloxy)butyl]terephthalate, Bis[4-(vinyloxymethyl)cyclohexylmethyl]glutarate, 1,4-Butanediol divinyl ether, 1,4-Butanediol vinyl ether, Butyl vinyl ether, tert-Butyl vinyl ether, 2-Chloroethyl vinyl ether, 1,4-Cyclohexanedimethanol divinyl ether, 1,4-Cyclohexanedimethanol vinyl ether, Di(ethylene glycol) divinyl ether, Di(ethylene glycol) vinyl ether, Ethylene glycol butyl vinyl ether, Ethylene glycol vinyl ether, Tris[4-(vinyloxy)butyl]trimellitate, 3-(Acryloyloxy)-2-hydroxypropyl methacrylate, Bis[2-(methacryloyloxy)ethyl] phosphate, Bisphenol A propoxylate diacrylate, 1,3-Butanediol diacrylate, 1,4-Butanediol diacrylate, 1,3-Butanediol dimethacrylate, 1,4-Butanediol dimethacrylate, N,N'-(1,2-Dihydroxyethylene)bisacrylamide, Di(trimethylolpropane) tetraacrylate, Diurethane dimethacrylate, N,N'-Ethylenebis(acrylamide), Glycerol 1,3-diglycerolate, Glycerol dimethacrylate, 1,6-Hexanediol diacrylate, 1,6-Hexanediol dimethacrylate, 1,6-Hexanediylbis[oxy(2-hydroxy-3,1-propanediyl)]bisacrylate, Hydroxypivalyl hydroxypivalate bis[6-(acryloyloxy)hexanoate], Neopentyl glycol diacrylate, Pentaerythritol diacrylate, Pentaerythritol tetraacrylate, Pentaerythritol triacrylate, Poly(propylene glycol) diacrylate, Poly(propylene glycol) dimethacrylate, 1,3,5-Triacryloylhexahydro-1,3,5-triazine, Tricyclo[5.2.1.0]decanedimethanol diacrylate, Trimethylolpropane benzoate diacrylate, Trimethylolpropane ethoxylate methyl ether diacrylate, Trimethylolpropane ethoxylate triacrylate, Trimethylolpropane triacrylate, Trimethylolpropane trimethacrylate, Tris[2-(acryloyloxy)ethyl] isocyanurate, Tri(propylene glycol) diacrylate.

Optionally, the monomer composition comprises at least one charged co-monomer.

Examples of cationic monomers for particle stability and particle size control are 2-methacryloxy ethyl trimethyl ammonium chloride (MOTAC), acryloxy ethyl trimethyl ammonium chloride (AOTAC), [3-(Methacryloylamino)propyl]trimethylammonium chloride, [2-(Methacryloyloxy)ethyl]trimethylammonium methyl sulfate solution, tetraallyl ammonium chloride, diallyl dimethyl ammonium chloride, (Vinylbenzyl)trimethylammonium chloride. Preferably 2-methacryloxy ethyl trimethyl ammonium chloride (MOTAC) and acryloxy ethyl trimethyl ammonium chloride (AOTAC) are used.

Examples of anionic monomers are sodium, potassium or triethylamine salts of methacrylic acid, Acrylic acid, 2-(Trifluoromethyl)acrylic acid, 3-(2-Furyl)acrylic acid, 3-(2-Thienyl)acrylic acid, 3-(Phenylthio)acrylic acid, Poly(acrylic acid) potassium salt, Poly(acrylic acid) sodium salt, Poly(acrylic acid), Poly(acrylic acid, sodium salt) solution, trans-3-(4-Methoxybenzoyl)acrylic acid, 2-Methoxycinnamic acid, 3-Indoleacrylic acid, 3-Methoxycinnamic acid, 4-Imidazoleacrylic acid, 4-Methoxycinnamic acid, Poly(styrene)-block-poly(acrylic acid), Poly(acrylonitrile-co-butadiene-co-acrylic acid), dicarboxy terminated, Poly(acrylonitrile-co-butadiene-co-acrylic acid), dicarboxy terminated, glycidyl methacrylate diester, 2,3-Diphenyl-Acrylic Acid, 2-Me-Acrylic Acid, 3-(1-Naphthyl)Acrylic Acid, 3-(2,3,5,6-Tetramethylbenzoyl)Acrylic Acid, 3-(4-Methoxyphenyl) Acrylic Acid, 3-(4-Pyridyl)Acrylic Acid, 3-p-Tolyl-Acrylic Acid, 5-Norbornene-2-Acrylic Acid, Trans-3-(2,5-Dimethylbenzoyl)Acrylic Acid, Trans-3-(4-Ethoxybenzoyl)Acrylic Acid, Trans-3-(4-Methoxybenzoyl)Acrylic Acid, 2,2'-(1,3-Phenylene)Bis(3-(2-aminophenyl)Acrylic Acid), 2,2'-(1,3-Phenylene)Bis(3-(2-Aminophenyl)Acrylic Acid) hydrochloride, 2,2'-(1,3-Phenylene)Bis(3-(2-Nitrophenyl)Acrylic Acid), 2-[2-(2',4'-Difluoro[1,1'-Biphenyl]-4-Yl)-2-Oxoethyl]Acrylic Acid, 2-(2-(2-Chloroanilino)-2-Oxoethyl)-3-(4-Methoxyphenyl)Acrylic Acid, 2-(2-((2-Hydroxyethyl) Amino)-2-Oxoethyl)-3-(4-Methoxyphenyl)Acrylic Acid, 2-(2-(Cyclohexylamino)-2-Oxoethyl)-3-(4-Methoxyphenyl) Acrylic Acid.

A preferred monomer composition comprises methyl methacrylate and methacrylic acid.

Preferably, an oil soluble initiator is used in the surfactant-free emulsion copolymerisation in order to control size, particle morphology and to reduce the residual monomers at the end of the reaction. Preferably an oil-soluble thermal initiator is added in step c) of the present process. Examples are 2,2'-Azobis(4-methoxy-2,4-dimethyl valeronitrile), 2,2'-Azobis(N-butyl-2-methylpropionamide), 2,2'-Azobis(2,4-dimethyl valeronitrile), Dimethyl 2,2'-azobis(2-methylpropionate), 2,2'-Azobis(2-methylbutyronitrile), also known as Vazo 67 (DuPont), 1,1'-Azobis(cyclohexane-1-carbonitrile), 2,2'-Azobis[N-(2-propenyl)-2-methylpropionamide], 1-[(1-cyano-1-methylethyl)azo]formamide, 2,2'-Azobis(N-cyclohexyl-2-methylpropionamide) (all available from Wako); Vazo 52 and Vazo 64 (available from DuPont), Luperox 331.

Preferably 2,2'-Azobis(2,4-dimethyl valeronitrile), Dimethyl 2,2'-azobis(2-methylpropionate), 2,2'-Azobis(2-methylbutyronitrile) or Vazo 67 are used.

The polymerizable composition of the invention usually comprises 0.1-15, preferably 1-10%, by weight of dye, 50-95%, preferably 70-90%, by weight of monomer, 1-40%, preferably 1-10%, by weight of crosslinking monomer, 1-30%, preferably 1-10%, by weight of ionic monomer and 0.1-10%, preferably 0.1-5%, by weight of initiator, all percentages are based on the total weight of the polymerizable composition (except solvent).

Polymer particles prepared according to the invention are preferably spherical particles with a size (diameter) in the range of 50-1000 nm and preferably with a monodisperse size distribution. Preferred particle sizes are 50-600 nm, preferably 50-560 nm, especially 50-500 nm, even more preferred 100-400 nm, Especially preferred are particles having a particle size of 150-400 nm, especially 150-350 nm. Particle sizes are determined by photon correlation spectroscopy of aqueous particle dispersions by a common apparatus such as a Malvern NanoZS particle analyser.

The size of polymer particles in electrophoretic fluids may be different from sizes measured in aqueous dispersions because of the influence of solvents and/or surfactants. In electrophoretic fluids, the polymer particles of the invention preferably have a particle size of 100-800 nm, especially 100-700 nm, preferably 150-700 nm are preferred. Especially preferred are polymer particles having a particle size of 150-600 nm.

To enhance the surface stabilisation or steric repulsions of the polymeric particles in a non-polar continuous phase, a steric stabiliser is preferably incorporated into the coloured polymer particles. Preferably a non-aqueous dispersion (NAD) stabiliser is adsorbed in to the particle.

Suitable NAD stabilisers are block copolymers with a comb shape structure. Especially block copolymers with a molecular weight of approximately 10,000-100,000 can be used. The molecular weight ratio of the backbone to hairs may be approximately 1:1. The particle dispersion medium (non-polar solvent) preferably is a poor solvent for the backbone. The backbone chemistry preferably is similar to the particle. The hairs preferably are rigid and the length of the hairs preferably is of the order of the distance required to sterically stabilise the particles. The particle dispersion medium preferably is a good solvent for the hairs. It is possible to attach chromophores and/or charging groups to the backbone and or the hairs. NAD stabilisers are commercially available or can be prepared to known methods, e.g. as described in 'Dispersion Polymerization in Organic Media', ISBN 0471 054186, edited by K. E. J. Barrett, published by John Wiley and Sons, Copyright 1975, by Imperial Chemical Industries Ltd. Preferred NAD stabilisers are for example poly(hydroxystearic acid), and poly(hydroxystearic acid) graft (poly) methyl methacrylate and methacrylic acid copolymers, Solsperse 3000, Solsperse 11,200, Solsperse 13,300 and Solsperse 13,240 from Lubrizol Ltd., UK. Advantageously stabilisers comprising additionally copolymerised glycidyl methacrylate may be permanently locked in the polymer particle. This is simply done in the same vessel, by raising the temperature and adding diethanolamine. This opens up a glycidyl ring which is then available to polymerise with unreacted carboxylic acid groups from a methacrylic acid monomer.

Cross-linked copolymer nanoparticles can preferably be prepared by emulsifier-free copolymerisation of methyl methacrylate (MMA), methacrylic acid, dye monomer, 1-octanethiol and NAD stabiliser using azobisisobutyronitrile (AIBN) or 2,2'-Azobis(2-methylbutyronitrile (Vazo 67) as an initiator. Preferably, polymerisations are conducted using a batch process.

Particles of the invention are primarily designed for use in electrophoretic displays. A typical electrophoretic display preferably consists of the particles dispersed in a low polar or non-polar solvent along with additives to improve electrophoretic properties, such as stability and charge, Examples of such dispersions are well described in the literature, for example U.S. Pat. No. 7,247,379; WO 99/10767; US 2007/0128352; U.S. Pat. No. 7,236,290; U.S. Pat. No. 7,170,670; U.S. Pat. No. 7,038,655; U.S. Pat. No. 7,277,218; U.S. Pat. No. 7,226,550; U.S. Pat. No. 7,110,162; U.S. Pat. No. 6,956,690; U.S. Pat. No. 7,052,766; U.S. Pat. No. 6,194,488; U.S. Pat. No. 5,783,614; U.S. Pat. No. 5,403,518; U.S. Pat. No. 5,380,362.

Typical additives to improve the stability of the fluid (either by steric stabilisation or by use as a charging agent) are known to experts in the field and include (but are not limited to) the Brij, Span and Tween series of surfactants (Aldrich), the Solsperse, Ircosperse and Colorburst series (Lubrizol), the OLOA charging agents (Chevron Chemicals) and Aerosol-OT (Aldrich).

Any other additives to improve the electrophoretic properties can be incorporated provided they are soluble in the formulation medium, in particular thickening agents or polymer additives designed to minimise settling effects.

The dispersion solvent can be chosen primarily on the basis of dielectric constant, refractive index, density and viscosity. A preferred solvent choice would display a low dielectric constant (<10, more preferably <5), high volume resistivity (about $10^{15}$ ohm-cm), a low viscosity (less than 5cst), low water solubility, a high boiling point (>80° C.) and a refractive index and density similar to that of the particles. Tweaking these variables can be useful in order to change the behavior of the final application. For example, in a slow-switching application such as poster displays or shelf labels, it can be advantageous to have an increased viscosity to improve the lifetime of the image, at the cost of slower switching speeds. However in an application requiring fast switching, for example e-books and displays, a lower viscosity will enable faster switching, at the cost of the lifetime in which the image remains stable (and hence an increase in power consumption as the display will need more frequent addressing). The preferred solvents are often non-polar hydrocarbon solvents such as the Isopar series (Exxon-Mobil), Norpar, Shell-Sol (Shell), Sol-Trol (Shell), naphtha, and other petroleum solvents, as well as long chain alkanes such as dodecane, tetradecane, decane and nonane). These tend to be low dielectric, low viscosity, and low density solvents. A density matched particle/solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachlorethylene, carbon tetrachloride, 1,2,4-trichlorobenzene and similar solvents. The negative aspect of many of these solvents is toxicity and environmental friendliness, and so in some cases it can also be beneficial to add additives to enhance stability to sedimentation rather than using such solvents.

The preferred additives and solvents used in the formulation of the particles of the invention are OLOA11000 (Chevron Chemicals), Ircosperse 2153 (Lubrizol Ltd), and dodecane (Sigma Aldrich)

Usually electrophoretic fluids comprise a charged inorganic nanoparticle such as titania, alumina or barium sulphate, coated with a surface layer to promote good dispersibility in dielectric media and a dielectric fluid media. The solvents and additives used to disperse the particles are not limited to those used within the examples of this invention and many other solvents and/or dispersants can be used. Lists of suitable solvents and dispersants for electrophoretic displays can be found in existing literature, in particular WO 99/10767) and WO 2005/017046) The Electrophoretic fluid is then incorporated into an Electrophoretic display element by a variety of pixel architectures, such as can be found in C. M. Lampert, Displays; 2004, 25(5) published by Elsevier B.V., Amsterdam.

Electrophoretic displays comprise typically, the electrophoretic display media in close combination with a monolithic or patterned backplane electrode structure, suitable for switching the pixels or patterned elements between the black and white optical states or their intermediate greyscale states.

The electrophoretic particles according to the present invention are suitable for all known electrophoretic media and electrophoretic displays, e.g. flexible displays, one particle systems, two particle systems, dyed fluids, systems comprising microcapsules, microcup systems, air gap systems and others as described in C. M. Lampert, Displays; 2004, 25(5) published by Elsevier B.V., Amsterdam. Examples of flexible displays are dynamic keypads, e-paper watches, dynamic pricing and advertising, e-readers, rollable displays, smart card media, product packaging, mobile phones, lab tops, display card, digital signage.

Apart from the preferred compounds mentioned in the description, the use thereof, compositions and processes, the claims disclose further preferred combinations of the subject-matters according to the invention.

The disclosures in the cited references are thus expressly also part of the disclosure content of the present application.

The following examples explain the present invention in greater detail without restricting the scope of protection. In particular, the features, properties and advantages, described in the examples, of the compounds on which the relevant examples are based can also be applied to other substances and compounds which are not described in detail, but fall within the scope of protection, unless stated otherwise elsewhere. In addition, the invention can be carried out throughout the range claimed and is not restricted to the examples mentioned here.

EXAMPLES

The characterisation of the formulations was performed using a Malvern NanoZS particle analyser. This instrument measures the size of particles in dispersion and the zeta potential of an electrophoretic fluid. The Zeta potential (ZP) is derived from the real-time measurement of the electrophoretic mobility and thus is an indicator of the suitability of the fluid for use in electrophoretic applications.

Example 1

Preparation of Red Particles Containing Disperse Red Methacrylate by Dispersion Polymerisation Decorative NAD stabiliser 33.8% by weight in solvents (obtained from ICI Ltd., product code X190-442) is precipitated in cold methanol, dried and dissolved in a 50:50 mixture of ethyl acetate (Aldrich) and butyl acetate (Aldrich).

Methyl methacrylate (25.5 g), methacrylic acid (0.5 g), disperse red 1 methacrylate (0.53 g), AIBN (0.23 g), 1-Octanethiol (0.14 g), dodecane (23.63 g), and NAD stabiliser (4.25 g)(30% by weight in 50:50 ethyl/butyl-acetate) are mixed and heated in a flask at 80° C. for two hours. The temperature is raised to 120° C. Diethanolamine (0.2 g) is added. After 12 hours, the reaction mixture is allowed to cool to room temperature. The dispersion is filtered through a 47 mm disc filter in a stainless steel holder by applying vacuum to a Buchner flask. A Durapore membrane of 0.1 μm pore size is used as a filtration media. The particles are washed with dodecane. Once the washing run colourless, the particles are redispersed in dodecane.

Yield: 23 g

Example 2

Preparation of Methacrylate Ester Derivative of CI Basic Blue 41

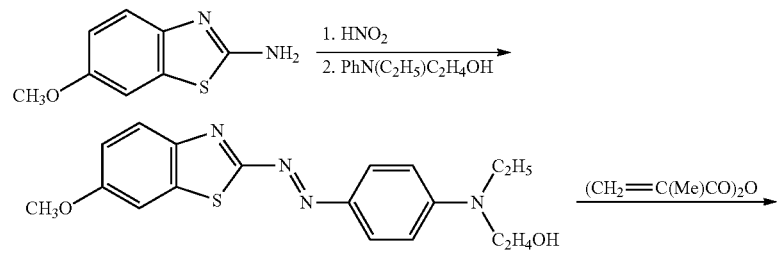

-continued

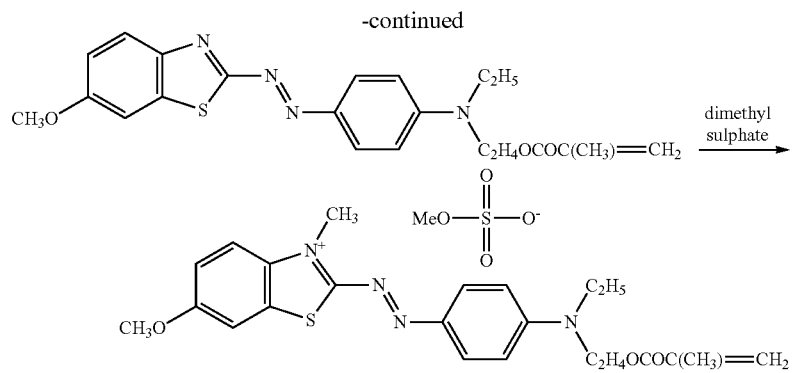

Stage 1

2-Amino-6-methoxybenzothiazole (18.0 g) is stirred in a mixture of acetic acid (70 ml) and propionic acid (50 ml) at 50° C. The resulting solution is cooled to −10° C. Nitrosylsulphuric acid solution (40 weight-% in sulphuric acid) (32.0 g) is added dropwise. This mixture is added to a stirred solution of N-ethyl-N-(2-hydroxyethyl) aniline and sulphamic acid (1.0 g) in acetic acid (25 ml) and ice/water (100 ml). After 20 minutes, the pH is raised to 4 by the dropwise addition of potassium hydroxide solution. A tarry residue is formed; the mixture is stirred for a further 2 hours until the tar solidifies. This solid is collected, washed with water and then dissolved in alcohol and acetone to give a deep red solution. Hot water is added to precipitate a solid which is removed by filtration. The solid is washed with cold alcohol and dried (29.5 g, 83% yield) Mp 178-179° C.

Stage 2

The above hydroxyethyl disperse dye (10.7 g) dye is stirred in methylene chloride (100 ml) and pyridine (20 ml). Methacrylic anhydride (10 ml) is added and the mixture is heated under reflux for 24 hours. On cooling to room temperature, water (5 ml) is added and the mixture is stirred for 2 hours. A volatile material is removed under reduced pressure, to leave a tarry residue which is stirred in 5 weight-% aqueous sodium bicarbonate solution for 16 hours. The resulting crude product is dissolved in methylene chloride/hexane (60/40) and passed through silica gel. After removal of solvent the solid residue (9.7 g) is crystallised from propan-2-ol to yield a rubine crystalline solid.

Yield 7.0 g, 55%. mp 123-125° C.

Stage 3

Dimethyl sulphate (1 ml) is added dropwise to a stirred solution of the methacrylate ester (1.06 g) in toluene (25 ml) at 100° C. After 10 minutes a tar begins to deposit on the walls of the flask and the mixture is allowed to cool to room temperature. The tar is washed with cold toluene and is stirred overnight in ethyl acetate (25 ml). The resulting semi-solid residue is collected, added to propan-2-ol and the mixture is heated to boiling. On cooling a solid is deposited which is washed with cold propan-2-ol and dried.

Yield 1.22 g, 89%. Mp 140-142° C. (97.3% main component by hplc) C23H27N4OS gives a mass ion of 439.

A mass spectrum of the sample gave a spectrum in positive ion mode. (EI+)

The spectra show ions at m/z 439 which corresponds with the cation for the proposed structure.

Example 3

Preparation of Blue Particles Containing Basic Blue 41 Methacrylate

In a 100 ml conical flask, 25.5 g methyl methacrylate and 0.5 g methacrylic acid, 0.53 g basic blue 41 methacrylate, 0:23 g AlBN, 0.14 g 1-Octanethiol, 23.63 g dodecane, and 4.25 g NAD stabiliser as used in Example 1 (30%) by weight in 50:50 ethyl/butyl-acetate) are added. The reaction mixture is heated in a water bath at 80° C. for two hours, while shaking. The temperature is raised to 120° C. Diethanolamine (0.2 g) is added. After 12 hours, the reaction mixture is allowed to cool to room temperature. The dispersion is filtered through a 47 mm disc filter in a stainless steel holder by applying vacuum to a Buchner flask. A Durapore membrane of 0.1 μm pore size is used as a filtration media. The particles are washed with dodecane. Once the washing run colourless, the particles are redispersed in dodecane.

Yield: approximately 20 g

The colour fastness of the particles is tested by washing the particle dispersion with a small amount of water—no colour can be detected in the water phase. When the experiment is repeated with dodecane containing a small amount of Basic Blue 41 methacrylate the dye is clearly detectable in the water phase. This is a strong experimental prove for the incorporation of the dye into the particle and colour fastness.

Example 4

Preparation of Yellow Dye Used in Particle Preparation of Example 5

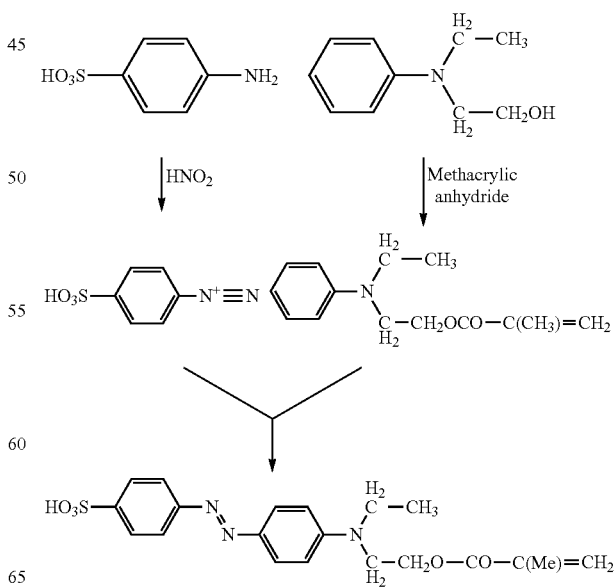

Stage 1

Methacrylic anhydride (7.7 g, 0.05 mol) is added to a solution of N-(2-hydroxyethyl)-N-ethylaniline (6.6 g, 0.04 mol) in pyridine (25 ml) and the mixture is stirred at 55° C. for 2 hours. On cooling the mixture is passed through silica gel to give N-(2-acryloyloxyethyl)-N-ethylaniline as a pale yellow oil. 5.3 g, 65%

Stage 2

A cold solution of 2N sodium nitrite (10.2 ml, 0.0204 mol) and sulphanilic acid (3.46 g, 0.02 mol) is added to stirred mixture of ice/dilute hydrochloric acid. After 1 hour at 0 to 5° C. excess nitrous acid is destroyed by the addition of sulphamic acid, and the resulting diazonium salt is added to a solution of N-(2-acryloyloxyethyl)-N-ethylaniline (4.06 g, 0.02 mol) in aqueous acetic acid. The pH of the cold solution is raised slowly to 4.5 by the dropwise addition of aqueous ammonia. After 2 hours the mixture is allowed to warm to room temperature and ammonium sulphate (5%) is added slowly with stirring. The resulting sticky solid (4) is collected and triturated with acetone and dried. 7.1 g., 82%. $^1$H NMR shows expected signals.

Example 5

Preparation of Yellow Particles Containing Acid Yellow Methacrylate Dye from Example 4

In a 250 ml 3-neck flask, methyl methacrylate (8.5 g, 0.085 mol) and methacrylic acid (0.17 g, 1.93 mmol), acid yellow dye methacrylate (4) (0.18 g), Vazo 67 (0.8 g), 1-Octanethiol (0.5 g, 0.319 mmol), dodecane (7.87 g), and NAD stabiliser (1.42 g) as used in Example 1 (30% by weight in 50:50 ethyl/butyl-acetate) are added. The reaction mixture is stirred in an oil bath at 80° C. for two hours. The temperature is raised to 120° C. Diethanolamine (0.2 g) is added. After 12 hours, the reaction mixture is allowed to cool to room temperature. The dispersion is filtered through a 50 micron cloth. The particles are washed with dodecane. Once the washing run colourless, the particles are redispersed in dodecane.

The washed yellow dispersion is centrifuged and redisperse several times to check whether yellow dye is leaching from the particles.

The supernatant appears colourless and clear to show that dye is not leaching into dodecane.

In addition the supernatants are analysed by ultra-violet/visible spectrophometric analysis over a suitable range (typically 350-700 nm) to determine if dye leaching is occurring. No leaching is detected.

Example 6

Electrophoretic Formulation Containing Red Particles of Example 1

0.00643 g of Aerosol-OT (Sigma-Aldrich) is added to 2.13900 g of red particles of Example 1 in dodecane (~25% solids content) and vortex mixed. The dispersion is then roller mixed overnight.

Size (438 nm), Electrophoretic Mobility (0.04175 μmcm/Vs), ZP (−47.3 mV).

Example 7

Electrophoretic Formulation Containing Red Particles of Example 1

0.00616 g of OLOA-11000 (Chevron Chemicals) is added to 2.00151 g of red particles of Example 1 in dodecane (−25% solids content) and vortex mixed. The dispersion is then roller mixed overnight.

Size (438 nm j, Electrophoretic Mobility (0.02538 μmcm/Vs), ZP (−24.7 mV).

Example 8

Electrophoretic Formulation Containing Blue Particles of Example 3

0.0500 g of A-OT (Sigma Aldrich) is added to 0.1139 g of blue particles of Example 3 in dodecane (~25% solids content) and 0.8350 g of dodecane, then vortex mixed. The dispersion is then roller mixed overnight. Size (320 nm), Electrophoretic Mobility (2.305 m$^2$/Vs×10$^{-10}$), ZP (−24.8 mV).

Example 9

Electrophoretic Formulation Containing Blue Particles of Example 3

0.0076 g of detergent Infineum E (Infineum Corporation) is added to 0.1132 g of blue particles of Example 3 in dodecane (~25% solids content) and 0.8789 g of dodecane, then vortex mixed. The dispersion is then roller mixed overnight.

Size (307 nm), Electrophoretic Mobility (8.148 m$^2$/Vs× 10$^{-10}$), ZP (+87.8 mV).

The invention claimed is:

1. A process for the preparation of coloured polymer particles for use in electrophoretic devices, comprising
   a) reacting at least one polymerisable dye, at least one monomer, optionally at least one steric stabiliser, at least one initiator, and optionally at least one charged co-monomer in a non-aqueous solvent to obtain coloured polymer particles, and further optionally
   b) washing the resulting coloured polymer particles.

2. Process according to claim 1, wherein the non-aqueous solvent is a non-polar solvent.

3. Process according to claim 1, wherein the polymerisable dye is a water-insoluble dye.

4. Process according to claim 1, wherein the polymerisable dye is a water-soluble dye.

5. Process according to claim 1, wherein a co-monomer is present during the reacting as steric stabiliser.

6. Process according to claim 1, wherein the polymerisable dye consists of a chromophore, one or more polymerisable groups, optional linker groups, optional groups to modify physical properties and optionally charged group(s).

7. Process according to claim 1, wherein the polymerisable dye is Disperse Red 1 methacrylate or acrylate, a dye of formula 1, a dye of formula 2, or a dye of formula 3, Formula 1

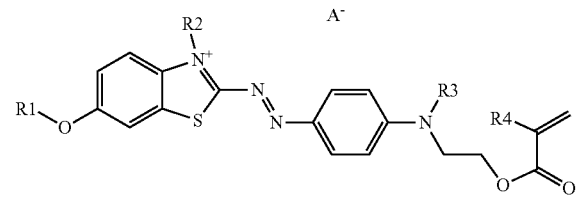

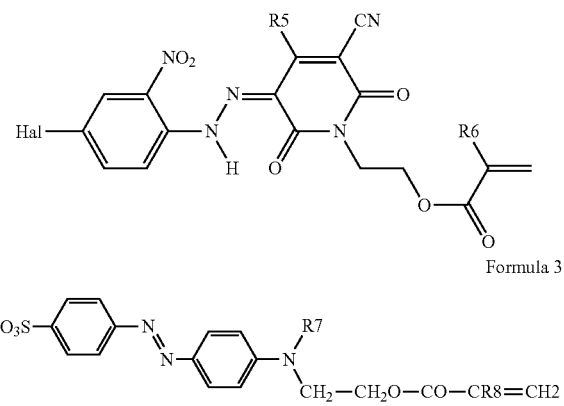

wherein R1, R2, R3, R5 and R7=alkyl,
R4, R6 and R8=H or CH₃,
Hal=halogen,
A⁻=halogen or a monobasic acid (oxo) anion.

8. Process according to claim 1, wherein the coloured polymer particles are prepared from a composition comprising a polymerisable dye, at least one monomer, a steric stabiliser, an initiator, and a non-aqueous, non-polar solvent in a batch process.

9. Process according to claim 1, wherein the coloured polymer particles have a diameter of 50-1000 nm.

10. A compound of formula 1

Formula 1

$$\text{[structure of Formula 1]}$$

wherein R1, R2 and R3=alkyl,
R4=H or CH₃
A⁻=halogen or a monobasic acid (oxo) anion.

11. A compound of formula 3

Formula 3

$$\text{[structure of Formula 3]}$$

wherein R7=alkyl,
R8=H or CH₃.

12. A process according to claim 1, wherein at least one steric stabiliser and at least one charged co-monomer are present during the reacting.

13. A process according to claim 1, comprising washing the resulting coloured polymer particles.

14. A process according to claim 1, wherein the polymerisable dye consists of a chromophore containing an azo group, an anthraquinone group or a phthalocyanine group, one or more polymerisable groups, optional linker groups, and optional groups to modify physical properties and optionally charged group(s).

15. A process according to claim 7, wherein the polymerisable dye is a dye of formula 1 which is a methacrylate or acrylate ester derivative of CI Basic Blue 41, a dye of formula 2 wherein Hal=Cl and R5 and R6=CH₃, or a dye of formula 3 wherein R7=C₂H₅ and R8=CH₃.

16. A process according to claim 1, wherein the coloured polymer particles have a diameter of 150-600 nm.

17. A compound of formula 1 of claim 10, wherein R1, R2, and R3=C1-C4 alkyl, R4=H or CH₃ and A⁻=acetate, propionate, lactate, methane sulphonate, p-toluenesulphonate, hydroxide or nitrate.

18. A compound of formula 1 of claim 10, wherein R1, R2 and R4=CH₃, R3=C₂H₅ and A⁻=methane sulfonate.

19. A compound of formula 3 of claim 11, wherein R7=C1-C4 alkyl.

20. A compound of formula 3 of claim 11, wherein R7=C₂H₅ and R8=CH₃.

21. A process according to claim 1, wherein the process is conducted in the absence of aqueous media.

22. A process according to claim 1, wherein the polymerisable dye contains one or more of the following polymerisable groups: methacrylate, acrylate, methacrylamide, acrylonitrile, a-substituted acrylate, styrene, vinyl ether, vinyl ester, propenyl ether, oxetane or epoxy.

23. A process according to claim 1, wherein the process is conducted in the absence of a surfactant.

* * * * *